Jan. 25, 1966    R. C. TALBOT    3,231,063
CARTON FEEDER
Filed Dec. 11, 1963    6 Sheets-Sheet 1

INVENTOR.
RICHARD C. TALBOT
BY
ATTORNEYS

Jan. 25, 1966  R. C. TALBOT  3,231,063
CARTON FEEDER

Filed Dec. 11, 1963  6 Sheets-Sheet 2

INVENTOR.
RICHARD C. TALBOT
BY
ATTORNEYS

Jan. 25, 1966  R. C. TALBOT  3,231,063
CARTON FEEDER
Filed Dec. 11, 1963  6 Sheets-Sheet 3

INVENTOR.
RICHARD C. TALBOT
BY
ATTORNEYS

Jan. 25, 1966  R. C. TALBOT  3,231,063
CARTON FEEDER
Filed Dec. 11, 1963  6 Sheets-Sheet 4
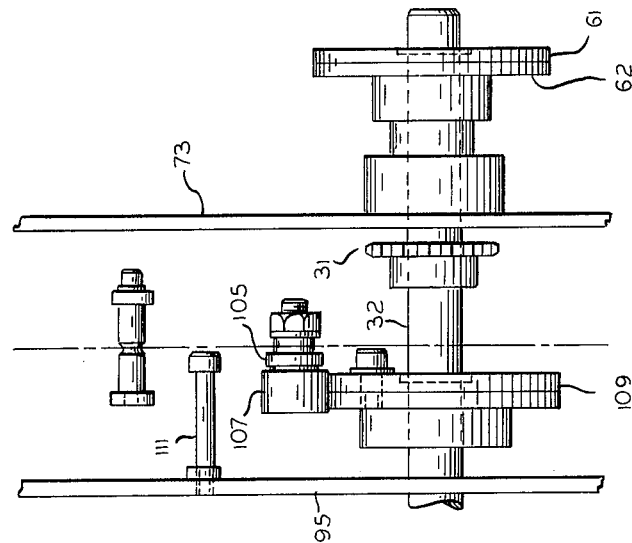
FIG. 5
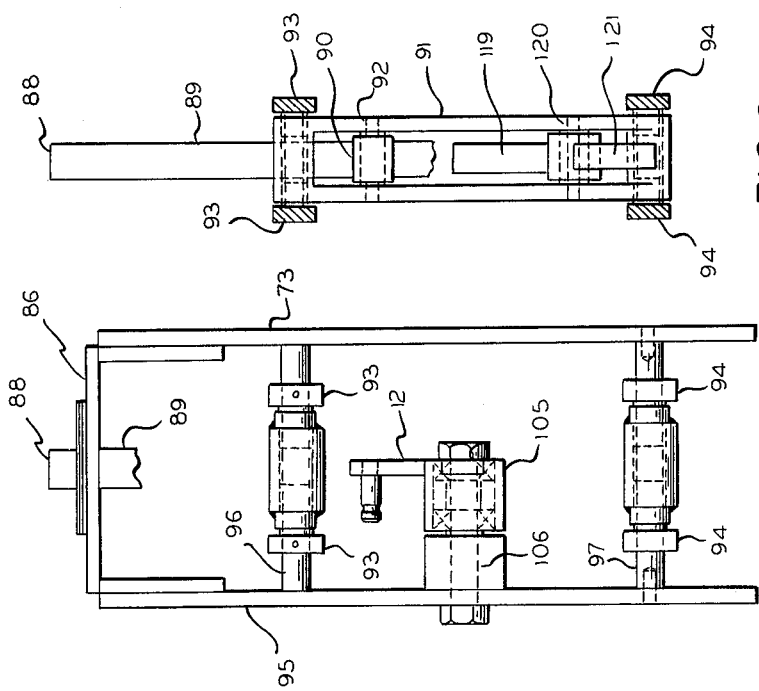
FIG. 6
FIG. 7
INVENTOR.
RICHARD C. TALBOT
BY
ATTORNEYS Jan. 25, 1966 R. C. TALBOT 3,231,063
CARTON FEEDER Filed Dec. 11, 1963 6 Sheets-Sheet 5

INVENTOR.
RICHARD C. TALBOT
BY
ATTORNEYS

United States Patent Office 3,231,063
Patented Jan. 25, 1966

3,231,063
CARTON FEEDER
Richard C. Talbot, Skokie, Ill., assignor to Peters Machinery Company, Chicago, Ill., a corporation of Illinois
Filed Dec. 11, 1963, Ser. No. 329,642
17 Claims. (Cl. 198—34)

This invention relates to improvements in apparatus for feeding and supplying cartons in predetermined timed relation with respect to each other.

A principal object of the present invention is to provide a conveying means for thin walled cartons so arranged as to provide a dwell in the supply of cartons for closing or other operations.

Another object of the invention is to provide a system of feeder conveyors for cartons and the like, in which a stop engaged by an individual carton holds the carton from travel along the feeder conveyors and in which the carton trips the stop to effect withdrawal thereof from the path of travel of the carton and time travel of the carton.

Another object of the invention is to provide an improved form of conveying means for a succession of cartons having stop means along the path of travel of the cartons for successively stopping the cartons to bring the cartons into timed relation with respect to an operation to be performed on the individual cartons, in which the cartons at the entering end of the conveying means are gripped as a carton comes into engagement with the stop and successively released as the carton passes over the stop, to space the cartons along the conveying means and time the travel of the cartons for a pick-up operation.

A still further object of the invention is to provide an automatic feed for cartons and the like in which the cartons are conveyed by belt conveyors engaging the sides thereof and a gripping device is provided at the entering ends of the conveyors, to grip and release the cartons and in which the gripping means and the conveying means alternately come into gripping and release relation with respect to the cartons, to hold the successive cartons from feeding movement until the advance carton has advanced and is timed to be carried by a pick-up means for closing or the performing of other operations thereon.

Still another object of the invention is to provide a feeder for thin walled cartons and the like, in which clamping means grip successive cartons and hold the cartons from travel and conveying means in advance of the clamping means move in and out of conveying relation with respect to the side walls of the carton alternately of the gripping means, and in which a stop projects in the path of travel of the carton along the conveying means and is tripped by movement of the carton along the conveying means and when tripped instigates a withdrawal operation withdrawing the stop from the path of travel of the carton and timing continued travel thereof.

Still another object of the invention is to provide a simple and improved form of carton feeding means for feeding thin walled cartons in predetermined timed spaced relation with respect to each other in which a stop interrupts the travel of the cartons and is tripped by engagement with a carton and when tripped positions an escapement in an operative position to effect successive withdrawal and repositioning of the stop.

These and other objects of the invention will appear from time to time as the following specification proceeds and with reference to the accompanying drawings wherein:

FIGURE 5 is a fragmentary sectional view taken substantially along line V—V of FIGURE 3;

FIGURE 6 is a fragmentary sectional view taken substantially along line VI—VI of FIGURE 3;

FIGURE 7 is a fragmentary sectional view taken substantially along line VII—VII of FIGURE 3;

Figures 8, 9:
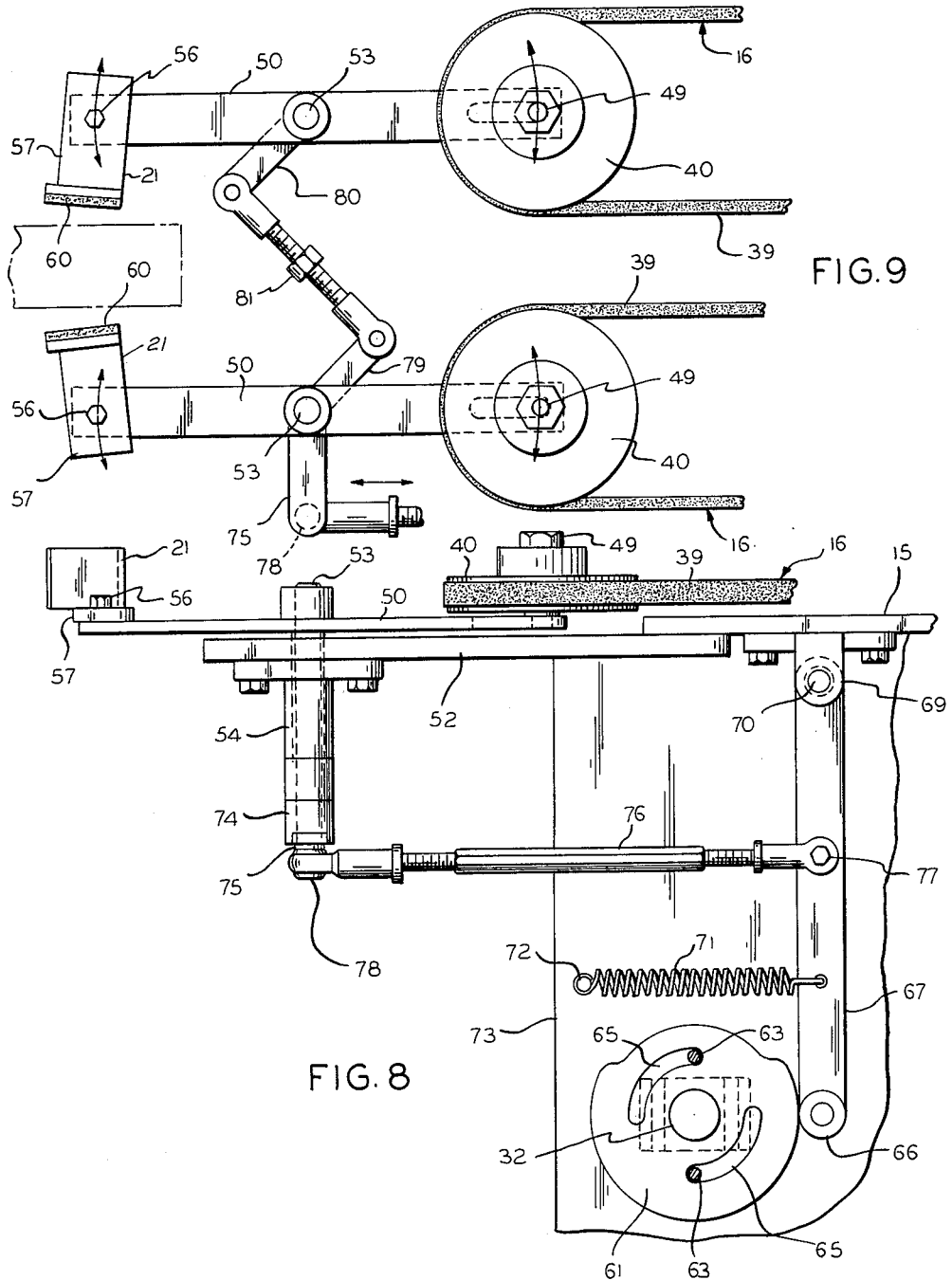
FIGURE 8 is a partial fragmentary side view of the machine with certain parts removed and certain other parts broken away in order to illustrate certain details of the clamping and release means for the cartons including the drive cam therefor.
Figure 10:
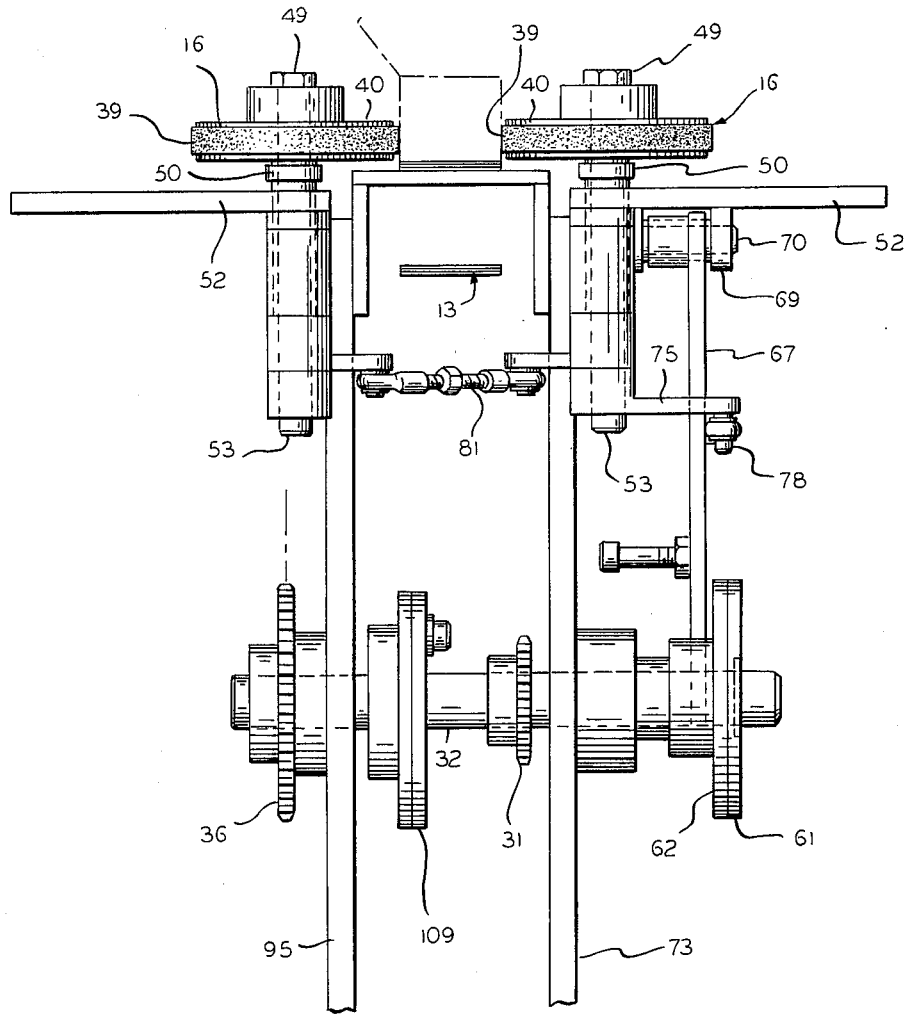

FIGURE 9 is a fragmentary plan view with certain parts broken away and certain other parts removed and showing the actuating mechanism for the gripping devices for the side walls of the cartons and bringing the conveyors into conveying association with the side walls of the cartons upon release of the gripping devices; and FIGURE 10 is a fragmentary end view looking at the entering end of the machine, with certain parts broken away and certain other parts removed in order to show certain details of the mechanism for actuating the gripping devices and bringing the side belt conveyors into and out of conveying engagement with the cartons, not shown in FIGURE 9.

Figure 1:
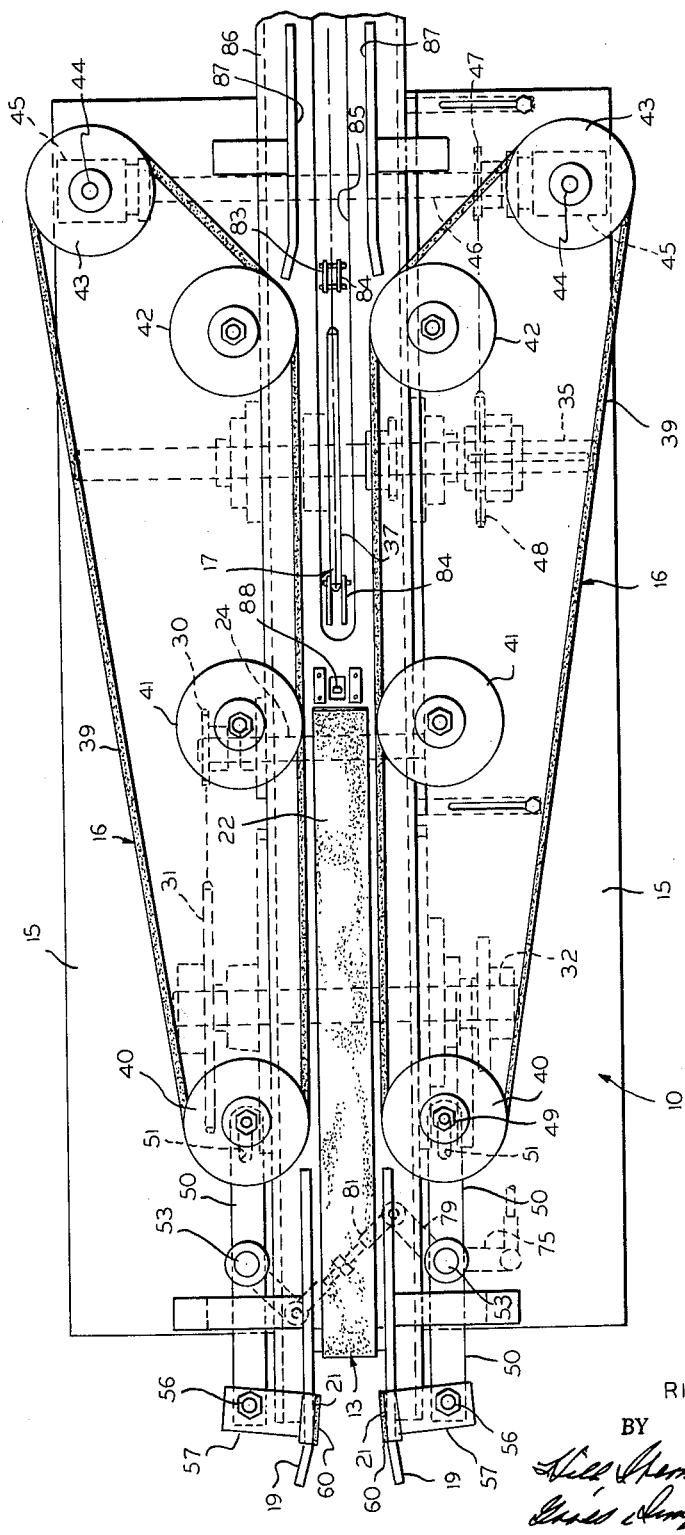
FIGURE 1 is a top plan view of a carton feeder constructed in accordance with the principles of the present invention.
Figure 2:
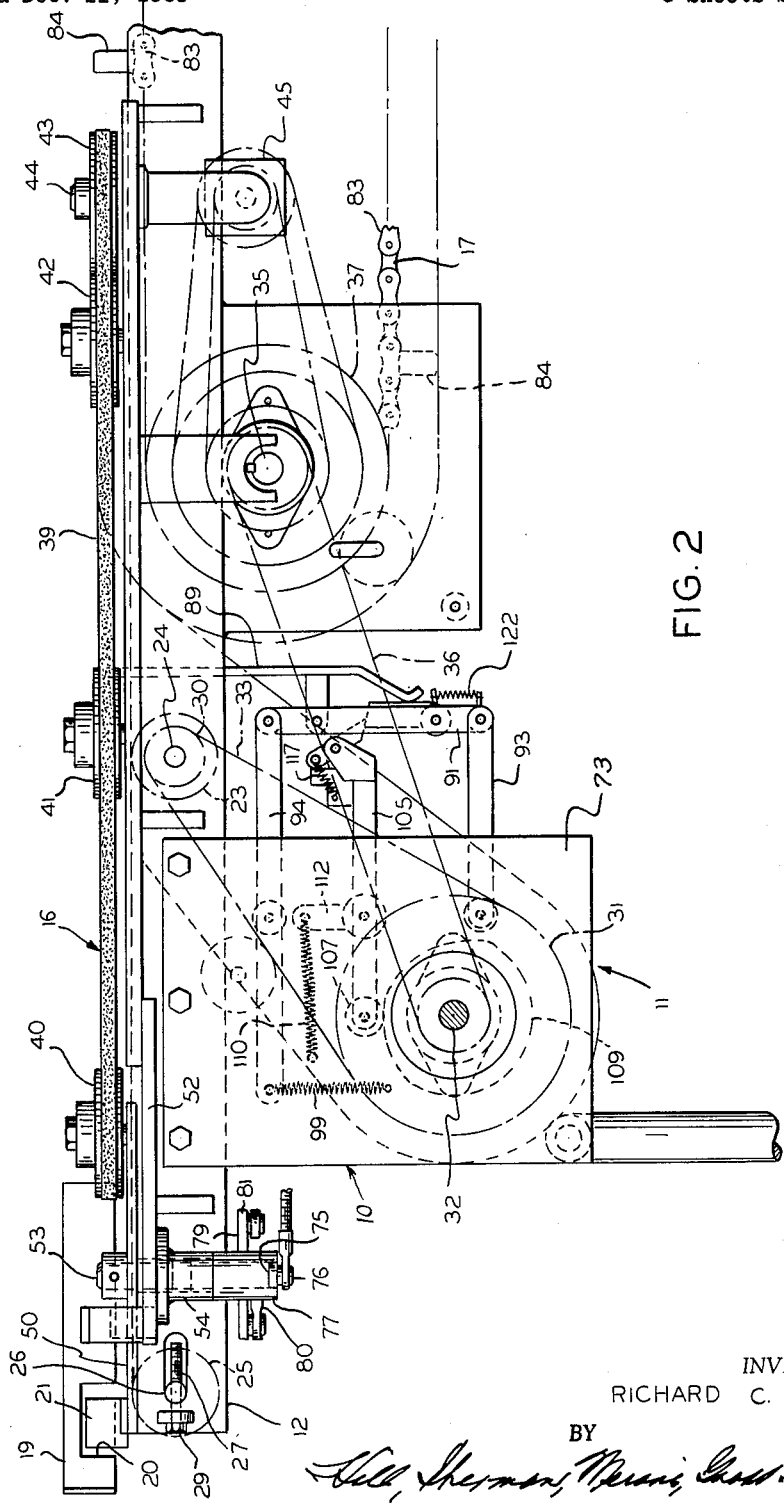
FIGURE 2 is a view in side elevation of the feeder shown in FIGURE 1.
Figure 4:
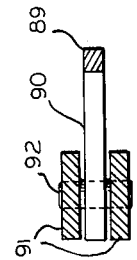
FIGURE 4 is a fragmentary sectional view taken substantially along line IV—IV of FIGURE 3.

In the embodiment of the invention illustrated in FIGURES 1 and 2 of the drawings, I have shown a carton feeder 10 including a frame 11 suitably supported in spaced relation with respect to the ground and having a pair of parallel spaced side frame members 12, 12 having a conveyor 13 movable therealong in the space therebetween for a portion of the length thereof. The frame also includes a horizontal plate 15 extending laterally from each side frame member 12 and forming supports for side belt conveyors 16, 16 extending along the frame for a portion of the length of the conveyor 13 and forwardly beyond said conveyor for supplying cartons to a lugged or flight conveyor 17 carrying the cartons in predetermined spaced relation with respect to each other for treatment.

The feeder also includes a pair of side guide plates 19 at the entering end of the conveyor 13 and extending therealong for a portion of the length thereof to positions adjacent the side belt conveyors 16. The side guide plates 19 have downwardly opening notches 20 therein accommodating clamping shoes 21 to pass therethrough into engagement with the carton and hold the carton from travel along the conveyor 13.

The conveyor 13 is shown as being a belt conveyor and may be a canvas belt conveyor including a belt 22 trained about a drive roller 23 on a drive shaft 24 at its discharge end and about an idler 25 at its receiving end. The idler 25 is mounted on a transverse shaft 26 extending along slots 27 in the side plates 12, and forming take-up slots for the belt, accommodating tension of the belt to be taken up by take-up screws 29. The drive shaft 24 has a sprocket 30 on an outer end thereof spaced outwardly of a side plate 12 and driven from a sprocket 31 on the cam shaft 32, through a drive chain 33. The cam shaft 32 in turn is driven from a parallel shaft 35 through a chain and sprocket drive 36. The shaft 35 has a direction changing idler sprocket 37 mounted thereon for changing the direction of the lugged conveyor 17 and is driven from said conveyor.

The side belt conveyors 16 consist of rubber covered fabric belts 39, which may be in the general form of V-belts and have flat outer surfaces extending along opposite sides of the conveyor 13 and forwardly therefrom to and along opposite sides of the lugged conveyor 17 for a portion of the length thereof. Each belt 39 changes its direction about a laterally movable idler pulley 40 at the entering end of the conveyor, movable inwardly upon release of the gripping shoes 21 to grip the sides of a carton and convey the carton therebetween, and movable outwardly as the gripping shoes 21 grip the sides of the carton. The belts 39 are also trained about idlers 41 intermediate the conveying runs of said belts and shown as being adjacent the discharge end of the canvas belt conveyor 13, and about idlers 42 at the outgoing end of the conveyor. From the idlers 42 the belts extend angularly outwardly and forwardly to drive pulleys 43 mounted on vertical shafts 44. The shafts 44 are driven from right angled drive gearing (not shown) which may be miter gearing or worm and worm gearing contained within a gear housing 45. A transverse drive shaft 46 is journalled within each gear housing 45 and forms a drive shaft for the gearing contained therein and for the vertical shafts 44 to drive the side belt conveyors 16 at the same rates of speed. The shaft 46 is driven from the shaft 35 by a chain and sprocket drive 48.

The idlers 40 are suitably journalled on idler shafts 49 suitably mounted at the forward ends of clamping levers 50 in slots 51, extending along said clamping levers. The clamping levers 50 are mounted intermediate their ends on vertical pivot shafts 53 extending above support plates 52 secured to the underside of the plates 15 and extending rearwordly therefrom. The pivot shafts 53 extend beneath the plates 52 and are journalled in bearing bosses 54 depending from said plates.

The clamping arms 50 have the gripping shoes 21 mounted at their forward ends. The gripping shoes 21 extend vertically of horizontal plates 57 mounted on the gripping arms 50 by nuts and bolts 56 and extend inwardly of said arms. The shoes 21 project upwardly of the inner ends of said arms. The shoes 21 may be made from metal having friction gripping faces 60 secured to the inner sides thereof by a suitable adhesive, in position to engage and grip the opposite sides of a carton moving along the conveyor 22.

The clamping arms 50 are actuated to alternately bring the clamping shoes 60 into engagement with the sides of a carton and move the receiving end portions of the belts 39 of the side conveyors 16 out of conveying relation with respect to a carton by means of a cam 61 on the cam shaft 32. The cam 61 is keyed or otherwise secured to an outer end portion of the cam shaft 32 and includes an inner disk 62 having the cam 61 secured to the outer face thereof as by machine screws 63. The machine screws 63 may be threaded in the inner disk 62 and extend through circumferential slots 65 formed in the cam 61, to enable the position of the camming surface of said cam to be varied to bring the gripping shoes into the proper gripping relation with respect to the cartons supplied to the conveyor 13.

The cam surface of the cam 61 is engaged by a follower roller 66 on the lower end of a rocking arm 67 pivoted at its upper end between the furcations of a bifurcated connector bracket 69 on a pivot pin 70. The bracket 69 is shown as being mounted on the underside of a plate 15 and as depending therefrom. A tension spring 71 is connected between the rocking arm 67 and a fixed connector 72, mounted on and extending outwardly of a side plate 73 of the frame 11. The shaft 53 has a sleeve 74 secured to its lower end portion, having a crank arm 75 extending radially therefrom. An adjustable link 76 is pivotally connected to the rocking arm 67 intermediate the ends of said rocking arm on a pivot pin 77. A vertical pivot pin 78 connects the opposite end of the link 76 to the crank arm 75, to rock the shaft 53 and plate 50, upon rocking movement of said shaft. A crank arm 79 extends angularly inwardly from the sleeve 73. Another crank arm 80 extends from the opposite shaft 53 parallel to the arm 80. An adjustable connecting link 81 is pivotally connected at its opposite ends to the free ends of the crank arms 79 and 80 to effect pivotal movement of the pivot shafts 53 in opposite directions, to bring the gripping surfaces 60 of the gripping shoes 21 into gripping engagement with the outer sides of a carton at the receiving end of the conveyor 13, to hold the carton from travel along said conveyor, and at the same time move the entering ends of the belts 39 of the side belt conveyors 16 laterally outwardly out of conveying association with a carton.

The lugged conveyor 17 is shown as being a single strand endless chain type of conveyor including an endless chain 83 trained about the sprocket 37 and suitably driven at its end opposite the sprocket 37 by a drive sprocket (not shown), in a conventional manner. The chain 83 has spaced lugs 84 extending upwardly therefrom, along a slot 85 formed in a plate 86, forming a continuation of a canvas belt conveyor 13 and extending to the discharge end of the machine. The lugs 84, pick up successive cartons traveling between the conveyors 16 and convey the cartons along the plate 86 between side guide plates 87 forming guiding continuations of the side conveyor belts 16. Each lug 84 is adapted to move behind a carton (not shown) and pick up the carton at the discharge end of the side belt conveyors 16 and convey the carton to have an operation performed thereon, such as a closing operation, or any other required operation. A timing means is provided for timing the individual cartons to be picked up by the lugs 84 in succession and to prevent the building up of cartons behind said lugs, causing the lugs to come into engagement with the bottoms of certain cartons and damage the cartons.

Figure 3:
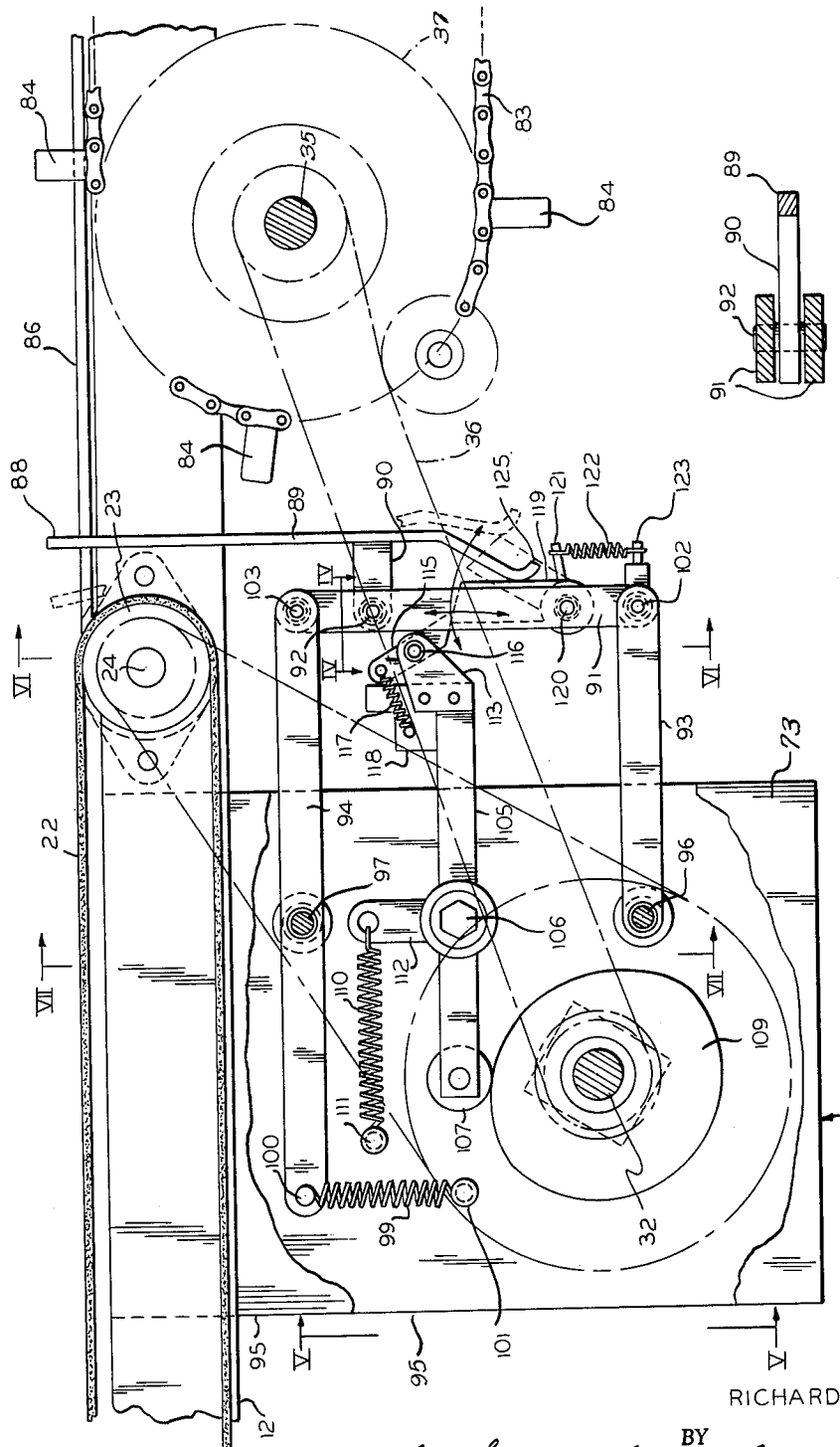
FIGURE 3 is an enlarged detail fragmentary side elevational view of the feeder with certain parts broken away and certain other parts shown in longitudinal section in order to illustrate the stop and the actuating means therefor.

The timing means, as herein shown, comprises a stop 88 projecting upwardly through the plate 87 rearwardly of the slot 85 and at the discharge end of the canvas belt conveyor 13. The stop 88 projects above the plate 86 into the path of travel of a carton along the conveyor 13 and between the side belt conveyors 16, to positively stop travel of a carton between said conveyors. As shown in FIGURES 2 and 3, the stop 88 is on the upper end of a trip lever 89. The trip lever 89 has an ear 90 extending rearwardly therefrom intermediate its ends, and pivotally connected between a pair of parallel spaced vertically movable connected links 91 on a transverse pivot pin 92. The links 91 are connected between the free ends of laterally spaced parallel upper arms 93, 93 and lower arms 94, 94. The arms 93, 93 are pivoted between a plate 95 of the frame 11 and the parallel plate 73 on a transverse pivot pin 96. The arms 94, 94 are pivoted between the plates 73 and 95 on a transverse pivot pin 97. The arms 94 are pivotally mounted on the pivot pin 87 intermediate their ends, and the ends of the arms 93 opposite the link 91 have a tension spring 99 connected thereto at one end on a connector pin 100 and connected to the plate 95 at its opposite end, on a pin 101. Pivot pins 102 and 103 connect the respective arms 93 and 94 to opposite ends of the link 91. The tension spring 99 thus serves to bias the arms 93 and 94, the link 91 and the stop 88 in upwardly extended relation with respect to the plate 86 and to thereby position the stop 88 to be engaged by and block movement of a carton between the side belts 39.

An escapement mechanism is provided to withdraw the stop 88 beneath the top of the plate 86, as it is moved by a carton from the dashed line position shown in FIGURE 3 to the solid line position shown in this figure. The escapement mechanism, as shown in FIGURES 2 and 3, comprises an escapement lever 105 pivoted intermediate its ends to the plate 95 on a transverse pivot pin 106 mounted on and extending inwardly of said plate. A follower roller 107 is rotatably mounted on the free end of the arm 105 for engagement with a cam 109 mounted on the cam shaft 32 between the plates 73 and 95 and rotatably driven by said cam shaft. The cam 109 like the cam 61 is in two parts, to enable the position of the cam face to be varied. A tension spring 110 is connected at one end to a pin 111 extending inwardly of the plate 95 and at its opposite end to an arm 112 extending upwardly of the escapement lever 105 and formed integrally therewith. The tension spring 110 biases the follower roller 107 in position to be engaged by the cam 109, to effect up and down movement of the escapement lever 105 about the axis of the pivot pin 106.

A bifurcated bracket 113 extends angularly upwardly of the opposite end of the escapement lever 105 from the follower roller 107 and has an escapement lever 115 mounted thereon intermediate its ends on a transverse pivot pin 116. A tension spring 117 is pivotally connected to the upper end of the escapement lever 115 at one end, and to an upright plate 118 at its opposite end, and biases the escapement lever 115 into position to engage the top surface of a dog or trip finger 119, pivotally mounted between the links 91 in downwardly spaced relation with respect to the pivot pin 92 on a transverse pivot pin 120. The dog 119 has an arm 121 extending outwardly therefrom toward the discharge end of the apparatus and having a tension spring 122 connected at one end to the free end of said lever and connected at its opposite end to a pin 123, secured to and extending outwardly of the links 91, for movement therewith.

The tension spring 122 thus biases the dog 119 into engagement with a finger portion 125 formed integrally with the lower end of the lever 89 and biases the lever 89 and stop 88 in the retracted position shown by broken lines in FIGURES 2 and 3. When the finger 125 and lever 89 are in their retracted positions, the escapement lever 115 is free from the dog 119. Rotation of the cam 109 will thus move the escapement finger 115 up and down along side of the dog 119. As however, a carton comes into engagement with the stop 88 and moves said stop from the broken line position shown in FIGURE 3 to the solid line position shown in this figure, the finger portion 125 on the lower end of the lever 89 will move the dog 119 against the bias of the spring 122 in position to be engaged by the trip finger 115. This will effect lowering movement of the arms 94 and 93 about the axes of the pivot pins 96 and 97 and of the link 91, and will thereby move the stop 88, beneath the top of the plate 86, to accommodate a carton to be conveyed past said stop along the plate 86 in position to be engaged by a conveying lug or flight 84 of the lugged conveyor 17.

As cartons are supplied to the feeder to be successively conveyed for closing or other operation, the gripping shoes 21 come into engagement with the side walls of the carton and hold the carton from travel along the canvas belt conveyor 13. At the same time the gripping shoes move to grip the side walls of the carton, the entering end portion of the side belt conveyors will move away from the line of travel of the carton to avoid the tendency of pulling cartons from the gripping shoes where they may extend from the gripping shoes to the side belts, and to assure the cartons will be held from travel between the side belts until the release of the stop 88 from an advance carton. The gripping shoes 21 and side belt conveyors 16 thus alternately move inwardly and outwardly of the line of travel of the cartons in predetermined timed relation with respect to travel of the side belt conveyors, to effect a separation of the cartons along the carton feeder in cooperation with the stop 88.

As the gripping shoes 21 release a carton and the side belt conveyors 16 come into conveying engagement with the side walls of a carton, the carton is positively conveyed by said side belts to engage the stop 88 and move the stop from the broken line position shown in FIGURE 3 to the solid line position shown in this figure. During this movement, this stop and lever 89 forming a downward continuation thereof, pivot about the axis of the pivot pin 92 and move the dog 119 against the bias of its spring 122 in position to be engaged by the escapement latch 115, continually moved up and down by the cam 109 and spring 110. The stop 88 will thus positively stop the carton and position the carton to be conveyed into the space between the lugs 84, 84 of the lugged conveyor 17, conveying the carton for a closing or other operation.

While I have herein shown and described one form in which the invention may be embodied, it may readily be understood that various variations and modifications in the invention may be attained without departing from the spirit and scope of the novel concepts thereof.

I claim as my invention:

1. In a feeder for cartons and the like, side belt conveyors engaging opposite sides of the carton and conveying the carton for processing, a trip lever having a stop on the upper end thereof extending into the path of travel of the carton between said conveyors, means pivotally mounting said trip lever for movement in the direction of travel of the carton to effect a tripping operation, said means being reciprocably movable up and down, and means for reciprocably moving said means down to withdraw said stop, comprising a dog tripped by said trip lever by engagement of said stop with a carton, and a reciprocably movable escapement lever engageable with said dog when in its tripped position, to effect downward movement of said dog and trip lever to withdraw said stop out of travel of a carton along said conveyor.

2. In a feeder for cartons and the like, a pair of side belt conveyors gripping opposite sides of the carton and conveying the carton for processing, a stop projecting in the path of travel of the carton along said conveyors, a trip lever forming a downward continuation of said stop and pivoted intermediate its ends for movement in the direction of carton travel to effect a tripping operation, means withdrawing said stop from the path of travel of the carton, comprising a support for said trip lever, mounted for alternate up and down movement, means biasing said support and stop in an up position, and means positioned by tripping movement of said stop by engagement by a carton for effecting downward movement of said support and trip lever, to thereby withdraw said stop from the path of travel of the carton.

3. In a feeder for cartons and the like, conveying means conveying a carton for processing, a stop extending in the path of travel of a carton, moved by the carton by engagement therewith in the direction of travel of the carton, to delay travel of the carton, said stop having a trip lever extending therefrom, a reciprocably movable support, a pivotal mounting for said trip lever on said support accommodating movement of said trip lever by a carton in the direction of travel thereof, an escapement having an escapement finger reciprocably movable up and down, said escapement finger extending into the path of travel of said support, and a dog pivotally mounted on said support and engaged by said trip lever and moved by said lever upon pivotal movement of said trip lever by the engagement of said stop by a carton into the path of travel of said escapement finger, to effect positive withdrawal of said stop from the path of travel of the carton, and to thereby accommodate continued movement of the carton along said conveyor.

4. In a feeder for cartons and the like, conveying means conveying a carton for processing, a stop extending in the path of carton travel and moved by the carton and stopping travel thereof, said stop having a trip lever extending therefrom, a support for said trip lever mounted for reciprocable movement, a pivotal mounting for said trip lever on said support, spring means biasing said support and trip lever into the path of travel of the carton along said conveying means, an escapement lever pivoted intermediate its ends, means reciprocably moving said escapement lever in the direction of reciprocable movement of said support, an escapement finger pivoted on said escapement lever and biased into the path of travel of said support, a latch dog pivoted to said support for pivotal movement about an axis parallel to the axis of pivotal connection of said trip lever thereto, and engaged by said latch dog, spring means moving said latch dog out of the path of travel of said escapement finger, and said trip lever moving said latch dog into the path of travel of said escapement finger by engagement of a carton therewith, to effect withdrawal of said stop and accommodate continued movement of a carton by said conveying means.

5. In a feeder for cartons and the like, conveying means conveying a carton for processing, and means delaying the travel of a carton along said conveying means to provide a predetermined spacing between succeeding cartons, comprising a trip lever having an upper end portion forming a stop normally in the path of travel of a carton along said conveying means, a continuously rotatably driven cam, escapement means reciprocably moved by said cam, a support reciprocably movable in the direction of reciprocable movement of said escapement means, a pivotal mounting for said trip lever on said support mounting said trip lever for movement about an axis extending transversely of said conveying means, a latch dog transversely pivoted to said support and movable into the path of travel of said escapement means to be engaged thereby, spring means biasing said latch dog into engagement with said trip lever and biasing said trip lever into a stopping position, said trip lever moving said latch dog into the path of travel of said escapement means upon engagement of a carton with said stop, and movement of said stop in the direction of carton travel of the carton effecting the positioning of said latch dog in the path of travel of said escapement means and withdrawal of said stop from the path of carton travel by movement of said escapement means.

6. In a feeder for cartons and the like, conveying means conveying a carton in a horizontal plane, a stop extending in the path of carton travel and movable vertically out of the path of carton travel by engagement of a carton therewith, said stop having a trip lever depending therefrom, a transverse pivotal support for said trip lever comprising a support mounted for vertical movement toward and from said conveyor, spring means biasing said support and trip lever upwardly toward said conveyor, means operable by said trip lever for effecting downward movement of said support and withdrawal of said stop from the path of carton travel, comprising a latch dog transversely pivoted to said support, spring means biasing said latch dog into engagement with said trip lever and positioning said stop into position to be moved by a carton in the direction of carton travel, escapement means supported for pivotal movement about an axis parallel to the axis of pivotal movement of said latch dog, a rotatably driven cam, spring means biasing said escapement lever into engagement with said cam to effect up and down movement of said escapement means, a carton traveling along said conveyor means engaging said stop and pivotally moving said trip lever about its axis of connection with said support to move said latch dog into the path of travel of said escapement means and thereby effecting downward movement of said support and stop upon downward movement of said escapement finger to accommodate continued travel of a carton along said conveyor means.

7. In a spacing means for cartons and the like, feeding cartons in predetermined spaced relation with respect to each other, a frame, two spaced side belt conveyors mounted on said frame and engaging opposite sides of a carton, for conveying a carton along said frame, a stop in the space between said conveyors and having a trip arm depending therefrom, a support for said trip arm including a support link mounted on said frame for vertical movement with respect thereto, a spring biasing said link in upwardly extending relation with respect to said frame, a transverse pivotal connection between said trip lever and said link, intermediate the ends of said trip lever, means vertically moving said link and trip lever comprising an escapement lever pivoted on said frame intermediate its ends, for movement about an axis extending transversely thereof, a continuously rotating cam, a spring biasing said escapement lever into operative association of said cam to effect up and down movement of said escapement lever by rotatable movement of said cam, an escapement finger transversely pivoted to the free end of said escapement lever, a spring extending said escapement finger with respect to said lever in the path of travel of said link, a latch dog transversely pivoted to said link, an engaging connection between the lower end of said trip lever and said latch dog, a spring biasing said latch dog into engagement with said trip lever and biasing said trip lever into a selected position between said belts to be engaged by a carton conveyed by said belts and pivoted about its axis of pivotal connection to said link, pivotal movement of said trip lever by a carton in the direction of travel of said carton, moving said latch dog in the path of vertical travel of said escapement finger and effecting engagement of said latch dog by said escapement finger and downward movement of said link to retract said stop beneath said conveyor and accommodate the continued travel of a carton along said conveyor.

8. In a spacing means and the like, feeding cartons in predetermined spaced relation with respect to each other, a conveyor including a sprocket rotatable about a horizontal axis in the direction of carton travel and having a chain turning thereabout having lugs spaced therealong and extending outwardly therefrom, means supplying cartons to said conveyor in the space between said cartons including two spaced side belt conveyors engaging opposite sides of a carton, and means delaying travel of the carton between said side belt conveyors and timing the cartons to be successively conveyed into the space between said lugs comprising a stop projecting into the path of carton travel in the space between said side belt conveyors, and moved in the direction of carton travel by engagement by a carton, a support for said stop including a vertically movable support link, spring means biasing said link in upward extended relation with respect to said conveyors, a trip lever depending from said stop along said support link, a transverse pivotal connection between said link and said trip lever, and means operated by movement of said stop and trip lever along said conveyors, for effecting downward movement of said support link, trip lever and stop comprising an oscillatably driven escapement lever pivoted intermediate its ends, an escapement finger pivoted to the forward end of said escapement lever, a spring biasing said escapement finger into intersecting relation with respect to said support link, and a latch dog transversely pivoted to said support link below the axis of connection of said trip lever to said support link and biased into engagement with said trip lever and biasing said trip lever into rearwardly extended relation with respect to said conveyors and moved by said trip lever to intersect the path of downward travel of said escapement finger and effect downward movement of said support link and stop therewith, to thereby accommodate continued travel of a carton to be picked up by said lugs.

9. In a spacing means for cartons and the like, feeding cartons in predetermined spaced relation with respect to each other, a conveyor including a sprocket rotatable about a horizontal axis in the direction of carton travel and having a chain turning thereabout having lugs spaced therealong and extending outwardly therefrom, means supplying cartons to said conveyor in the space between said cartons including two spaced side belt conveyors engaging opposite sides of a carton, and means delaying travel of the carton between said side belt conveyors and timing the cartons to be successively conveyed into the space between said lugs comprising a stop projecting into the path of carton travel in the space between said side belt conveyors, and moved in the direction of carton travel by engagement by a carton, a support for said stop including a vertically movable support link, spring means biasing said link in upward extended relation with respect to said conveyors, a trip lever depending from said stop along said support link, a transverse pivotal connection between said link and said trip lever, and means operated by movement of said stop and trip lever along said conveyors, for effecting downward movement of said support link, trip lever and stop comprising an oscillatably driven escapement lever pivoted intermediate its ends, an escapement finger pivoted to the forward end of said escapement lever, a spring biasing said escapement finger into intersecting relation with respect to said support link, and a latch dog transversely pivoted to said support link below the axis of connection of said trip lever to said support link and biased into engagement with said trip lever and biasing said trip lever into rearwardly extended relation with respect to said conveyors and moved by said trip lever to intersect the path of downward travel of said escapement finger and effect downward movement of said support link and stop therewith, to thereby accommodate continued travel of a carton to be picked up by said lugs, and means for successively supplying cartons to said stop in predetermined spaced relation with respect to each other comprising gripping shoes engageable with opposite sides of a carton at the entering ends of said side belt conveyors upon engagement of said gripping shoes with the sides of a carton.

10. In a spacing means and the like, feeding cartons in predetermined spaced relation with respect to each other, a conveyor including a sprocket rotatable about a horizontal axis in the direction of carton travel and having a chain turning thereabout having lugs spaced therealong and extending outwardly therefrom, means supplying cartons to said conveyor in the space between said cartons including two spaced side belt conveyors engaging opposite sides of a carton, and means delaying travel of the carton between said side belt conveyors and timing the cartons to be successively conveyed into the space between said lugs comprising a stop projecting into the path of carton travel in the space between said side belt conveyors, and moved in the direction of carton travel by engagement by a carton, a support for said stop including a vertically movable support link, spring means biasing said link in upward extended relation with respect to said conveyors, a trip lever depending from said stop along said support link, a transverse pivotal connection between said link and said trip lever, and means operated by movement of said stop and trip lever along said conveyors, for effecting downward movement of said support link, trip lever and stop comprising an oscillatably driven escapement lever pivoted intermediate its ends, an escapement finger pivoted to the forward end of said escapement lever, a spring biasing said escapement finger into intersecting relation with respect to said support link, and a latch dog transversely pivoted to said support link below the axis of connection of said trip lever to said support link and biased into engagement with said trip lever and biasing said trip lever into rearwardly extended relation with respect to said conveyors and moved by said trip lever to intersect the path of downward travel of said escapement finger and effect downward movement of said support link and stop therewith, to thereby accommodate continued travel of a carton to be picked up by said lugs, and means for successively supplying cartons to said stop comprising spaced gripping shoes on opposite sides of the path of travel of the cartons along said conveyor, means moving said shoes toward and from each other to grip and release a carton, said side belt conveyors having laterally movable receiving ends movable into and out of conveying relation with respect to the sides of a carton, and means operated by said means for moving said gripping shoes toward and from each other, for alternately moving the receiving ends of said side belt conveyors into and out of conveying relation with respect to the sides of a carton.

11. In a spacing means and the like, feeding cartons in predetermined spaced relation with respect to each other, a conveyor including a sprocket rotatable about a horizontal axis in the direction of carton travel and having a chain turning thereabout having lugs spaced therealong and extending outwardly therefrom, means supplying cartons to said conveyor in the space between said cartons including two spaced side belt conveyors engaging opposite sides of a carton, and means delaying travel of the carton between said side belt conveyors and timing the cartons to be successively conveyed into the space between said lugs comprising a stop projecting into the path of carton travel in the space between said side belt conveyors, and moved in the direction of carton travel by engagement by a carton, a support for said stop including a vertically movable support link, spring means biasing said link in upward extended relation with respect to said conveyors, a trip lever depending from said stop along said support link, a transverse pivotal connection between said link and said trip lever, and means operated by movement of said stop and trip lever along said conveyors, for effecting downward movement of said support link, trip lever and stop comprising an oscillatably driven escapement lever pivoted intermediate its ends, an escapement finger pivoted to the forward end of said escapement lever, a spring biasing said escapement finger into intersecting relation with respect to said support link, and a latch dog transversely pivoted to said support link below the axis of connection of said trip lever to said support link and biased into engagement with said trip lever and biasing said trip lever into rearwardly extended relation with respect to said conveyors and moved by said trip lever to intersect the path of downward travel of said escapement finger and effect downward movement of said support link and stop therewith, to thereby accommodate continued travel of a carton to be picked up by said lugs, and means for successively supplying cartons to said stop comprising spaced gripping shoes on opposite sides of the path of travel of the cartons along said conveyor, means moving said shoes toward and from each other to grip and release a carton, said side belt conveyors having laterally movable receiving ends movable into and out of conveying relation with respect to the sides of a carton, means for moving the receiving ends of said side belt conveyors into and out of conveying relation with respect to a carton comprising spaced rocking members pivoted for movement about vertical axes on opposite sides of said conveyor and having operative association with said gripping shoes and moving said gripping shoes into gripping engagement with a carton while moving the receiving ends of said conveyors out of conveying relation with respect to a carton and vice versa, and power driven means for rocking said rocking members back and forth in timed relation with respect to the speed of travel of said conveyor.

12. In a spacing means and the like, feeding cartons in predetermined spaced relation with respect to each other, a conveyor including a sprocket rotatable about a horizontal axis in the direction of carton travel and having a chain turning thereabout having lugs spaced therealong and extending outwardly therefrom, means supplying cartons to said conveyor in the space between said cartons including two spaced side belt conveyors engaging opposite sides of a carton, and means delaying travel of the carton between said side belt conveyors and timing the cartons to be successively conveyed into the space between said lugs comprising a stop projecting into the path of carton travel in the space between said side belt conveyors, and moved in the direction of carton travel by engagement by a carton, a support for said stop including a vertically movable support link, spring means biasing said link in upward extended relation with respect to said conveyors, a trip lever depending from said stop along said support link, a transverse pivotal connection between said link and said trip lever, and means operated by movement of said stop and trip lever along said conveyors, for effecting downward movement of said support link, trip lever and stop comprising an oscillatably driven escapement lever pivoted intermediate its ends, an escapement finger pivoted to the forward end of said escapement lever, a spring biasing said escapement finger into intersecting relation with respect to said support link, and a latch dog transversely pivoted to said support link below the axis of connection of said trip lever to said support link and biased into engagement with said trip lever and biasing said trip lever into rearwardly extended relation with respect to said conveyors and moved by said trip lever to intersect the path of downward travel of said escapement finger and effect downward movement of said support link and stop therewith, to thereby accommodate continued travel of a carton to be picked up by said lugs, and means for successively supplying cartons to said stop comprising spaced gripping shoes on opposite sides of the path of travel of the cartons along said conveyor, means moving said shoes toward and from each other to grip and release a carton, said side belt conveyors having laterally movable receiving ends movable into and out of conveying relation with respect to the sides of a carton, means for moving the receiving ends of said side belt conveyors into and out of conveying relation with respect to a carton comprising spaced rocking members pivoted for movement about vertical axes on opposite sides of said conveyor and having operative association with said gripping shoes and moving said gripping shoes into gripping engagement with a carton while moving the receiving ends of said conveyors out of conveying relation with respect to a carton and vice versa, and power driven means for rocking said rocking members back and forth in timed relation with respect to the speed of travel of said conveyor, comprising a cam, a pivoted lever, a follower on said lever engaging said cam, a crank oscillatably driven by said lever, an operative connection between said crank and one of said rocking members, and a linkage connection between said crank and said other rocking member for rocking said other rocking member in opposite relation with respect to rocking movement of said one rocking member.

13. In a feeder for cartons and the like, spaced gripping shoes movable about vertical axes into and out of gripping relation with respect to a carton, spaced side belt conveyors extending in advance of said gripping shoes, said side belt conveyors having receiving ends movable into and out of conveying relation with respect to a carton, a power driven rotatable cam, and a drive connection from said cam to said gripping shoes and the receiving ends of said conveyors for moving said gripping shoes into gripping relation with respect to a carton and the receiving ends of said conveyors in release relation with respect to a carton and vice versa, means between said side belt conveyors timing the travel of the carton therealong comprising a stop projecting in the path of travel of the carton along said conveyors and tripped by movement of the carton along said conveyors, and means operable by tripping of said stop for withdrawing said stop and accommodating continued travel of a carton along said conveyors.

14. In a feeder for cartons and the like, spaced gripping shoes movable about vertical axes into and out of gripping relation with respect to a carton, spaced side belt conveyors extending in advance of said gripping shoes, said side belt conveyors having receiving ends movable into and out of conveying relation with respect to a carton, a power driven rotatable cam, and a drive connection from said cam to said gripping shoes and the receiving ends of said conveyors for moving said gripping shoes into gripping relation with respect to a carton and the receiving ends of said conveyors in release relation with respect to a carton and vice versa, means between said side belt conveyors timing the travel of the carton therealong comprising a stop projecting in the path of travel of the carton along said conveyors and tripped by movement of the carton along said conveyors, means operable by tripping of said stop for withdrawing said stop and accommodating continued travel of a carton along said conveyors, comprising a trip lever forming a downward continuation of said stop, a support link beneath said conveyors and mounted for movement toward and from said conveyors, a transverse pivotal connection between said trip lever and said support link, spring means biasing said support link in upwardly extended relation with respect to said conveyors and maintaining said stop in position to be engaged by a carton traveling between said conveyors, an escapement oscillatably movable about a transverse axis, cam means for effecting oscillatable movement of said escapement, and a dog on said support link moved by said trip lever in position to be engaged by said escapement and moved downwardly thereby to move said stop to a release position, upon movement of said trip lever to a tripping position.

15. In a feeder for cartons and the like, a conveyor, spaced gripping shoes on opposite sides of said conveyor adjacent the entering end thereof, means moving said gripping shoes towards and from each other to grip and release a carton to be picked up by said conveyor, spaced side belt conveyors extending along opposite sides of said conveyor, said side belt conveyors having laterally movable receiving ends movable into and out of conveying relation with respect to the sides of a carton, and means operated by said means for moving of said gripping shoes toward and from each other, for alternately moving the receiving ends of said side belt conveyors into and out of conveying relation with respect to the sides of a carton.

16. In a feeder for cartons and the like, a conveyor, spaced gripping shoes on opposite sides of said conveyor adjacent the entering end thereof, means moving said gripping shoes towards and from each other to grip and release a carton to be picked up by said conveyor, spaced side belt conveyors extending along opposite sides of said conveyor, said side belt conveyors having laterally movable receiving ends movable into and out of conveying relation with respect to the sides of a carton, means for moving the receiving ends of said side belt conveyors into and out of conveying relation with respect to a carton comprising spaced rocking members pivoted for movement about vertical axes on opposite sides of said conveyor and having operative association with said gripping shoes and moving said gripping shoes into gripping engagement with a carton while moving the receiving ends of said conveyors out of conveying relation with respect to a carton and vice versa, and power driven means for rocking said rocking members back and forth in timed relation with respect to the speed of travel of said conveyor.

17. In a feeder for cartons and the like, a conveyor, spaced gripping shoes on opposite sides of said conveyor adjacent the entering end thereof, means moving said gripping shoes towards and from each other to grip and release a carton to be picked up by said conveyor, spaced side belt conveyors extending along opposite sides of said conveyor, said side belt conveyors having laterally movable receiving ends movable into and out of conveying relation with respect to the sides of a carton, means for moving the receiving ends of said belt conveyors into and out of conveying relation with respect to a carton comprising spaced rocking members pivoted for movement about vertical axes on opposite sides of said conveyor and having operative association with said gripping shoes and moving said gripping shoes into gripping engagement with a carton while moving the receiving ends of said conveyors out of conveying relation with respect to a carton and vice versa, and power driven means for rocking said rocking members back and forth in timed relation with respect to the speed of travel of said conveyor, comprising a cam, a pivoted lever, a follower on said lever engaging said cam, a crank oscillatably driven by said lever, an operative connection between said crank and one of said rocking members, and a linkage connection between said crank and said other rocking member for rocking said other rocking member in opposite relation with respect to rocking movement of said one rocking member.

References Cited by the Examiner
UNITED STATES PATENTS

| | | | |
|---|---|---|---|
| 1,096,918 | 5/1914 | Johnson | 198—165 X |
| 2,840,223 | 6/1958 | Schoppee | 198—34 |
| 3,155,220 | 11/1964 | Thorp | 198—34 |

SAMUEL F. COLEMAN, *Primary Examiner.*

EDWARD A. SROKA, *Examiner.*